United States Patent [19]
Werner et al.

[11] Patent Number: 4,998,750
[45] Date of Patent: Mar. 12, 1991

[54] GAS GENERATOR ESPECIALLY FOR INFLATING A SAFETY BAG

[75] Inventors: Bernd Werner, Schliersee; Harald Voggenreiter, Neubiberg, both of Fed. Rep. of Germany

[73] Assignee: Bayern-chemie Gesellschaft fuer Flugchemisch Antriebe mbH, Aschau am Inn, Fed. Rep. of Germany

[21] Appl. No.: 421,552

[22] Filed: Oct. 13, 1989

[30] Foreign Application Priority Data

Oct. 13, 1988 [DE] Fed. Rep. of Germany ....... 3834892

[51] Int. Cl.$^5$ ............................................. B60R 21/26
[52] U.S. Cl. ................................... 280/740; 280/742; 22/564; 239/590.3; 239/590.5
[58] Field of Search ............... 280/728, 740, 741, 742, 280/736, 730, 731, 732; 102/530, 531; 422/165, 166; 222/3, 564; 239/553.3, 555.5, 590.3, 590.5

[56] References Cited

U.S. PATENT DOCUMENTS

| | | | |
|---|---|---|---|
| 3,690,695 | 9/1972 | Jones, Sr. | 280/741 |
| 3,868,125 | 2/1975 | Fisher et al. | 280/740 |
| 3,877,882 | 4/1975 | Lette et al. | 280/741 |
| 4,131,299 | 12/1978 | Ono et al. | 280/736 |
| 4,343,435 | 8/1982 | Anderton et al. | 239/590.3 |
| 4,796,912 | 1/1989 | Lauritzen | 280/742 |

FOREIGN PATENT DOCUMENTS

| | | | |
|---|---|---|---|
| 903693 | 2/1954 | Fed. Rep. of Germany ... | 239/590.5 |
| 2330194 | 12/1974 | Fed. Rep. of Germany ...... | 280/740 |
| 52-28733 | 3/1977 | Japan | 239/553.3 |
| 64-41440 | 2/1989 | Japan | 280/736 |

Primary Examiner—Charles A. Marmor
Assistant Examiner—Karin Tyson
Attorney, Agent, or Firm—W. G. Fasse; D. H. Kane, Jr.

[57] ABSTRACT

A gas generator has a gas generating combustion chamber with an igniter or fuse for igniting an ignitable charge needed for the gas generation. At least one filter housing is attached to the gas generating chamber. The generated pressurized gases enter into the filter housing in one direction, for example an axial direction, and pass out of the filter in another direction, for example in a radial direction, under the influence of a gas flow distribution member which makes sure that the filter volume is efficiently used by uniformly distributing the gas volume throughout the filter volume. The gas exiting from the filter housing inflates a safety bag for the protection of persons in a vehicle.

21 Claims, 6 Drawing Sheets

GAS GENERATOR ESPECIALLY FOR INFLATING A SAFETY BAG

FIELD OF THE INVENTION

The invention relates to a gas generator for inflating a safety bag, for example, in a motor vehicle for protecting persons in the vehicle against injury resulting from impacts.

BACKGROUND INFORMATION

Gas generators of the above type are known in the art. These generators have a gas generating chamber including an igniter for a combustion charge and at least one filter housing. The generated compressed gases must pass through the filter volume before they pass through an exit for use in a safety device for the protection of persons in a vehicle, such as inflating a safety bag. U.S. Pat. No. 3,868,125 describes a gas generator which includes deflection sheet metal elements to permit air to flow radially into the gas generator for mixing with the generated compressed gas for filling and inflating a safety bag, whereby the mixed gas flows axially out of the gas generator. However, the filtering of the generated gas and of the mixed gas poses a problem in that the entire filtering volume is not uniformly exposed to the gas flow to be filtered.

OBJECTS OF THE INVENTION

In view of the foregoing it is the aim of the invention to achieve the following objects singly or in combination:

To construct a gas generator with its filtering device in such a way that the gas to be filtered is distributed as uniformly as possible over the filter surface. So that the entire filter volume is uniformly and homogeneously used for the filtering to thereby efficiently use the available filter volume;

To use a flow distribution member which assures the homogeneous distribution of the gas stream throughout the filter volume for a more efficient filtering and filter utilization; and To combine an efficient filtering with a still sufficiently rapid inflation of the safety bag.

SUMMARY OF THE INVENTION

The above objects have been achieved by the combination of the following features according to the invention. A ring filter body or cartridge is arranged in a filter housing to receive gas to be filtered in one direction and to discharge filtered gas in another direction. For this purpose a gas discharge surface of the ring filter body or cartridge faces respective openings in the filter housing. A gas flow distribution member is arranged centrally in the ring filter body or cartridge and diverts an initial gas in-flow into a filtered gas out-flow directed approximately perpendicularly to an in-flow direction. The gas flow distribution member causes a turbulence in the gas in-flow thereby uniformly distributing the gas in-flow onto the entire ring filter cartridge volume.

For example, an axial gas in-flow is converted into a turbulent radial flow. The gas flow distribution member comprises a plurality of flow throttling and deflecting elements extending radially and substantially across the axial initial flow direction of the in-flowing gas. The flow throttling and deflecting elements are axially spaced from each other and have a diameter which preferably increases in the axial gas flow direction. Thus, the deflecting element closest to an axial gas inlet has the smallest diameter or surface area while the deflection element furthest away from the axial gas inlet has the largest diameter or cross-sectional area.

The most important advantage of the features set forth above is seen in the homogeneous distribution of the gas flow to be filtered over the available filter cartridge volume, thereby achieving an efficient filter utilization.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
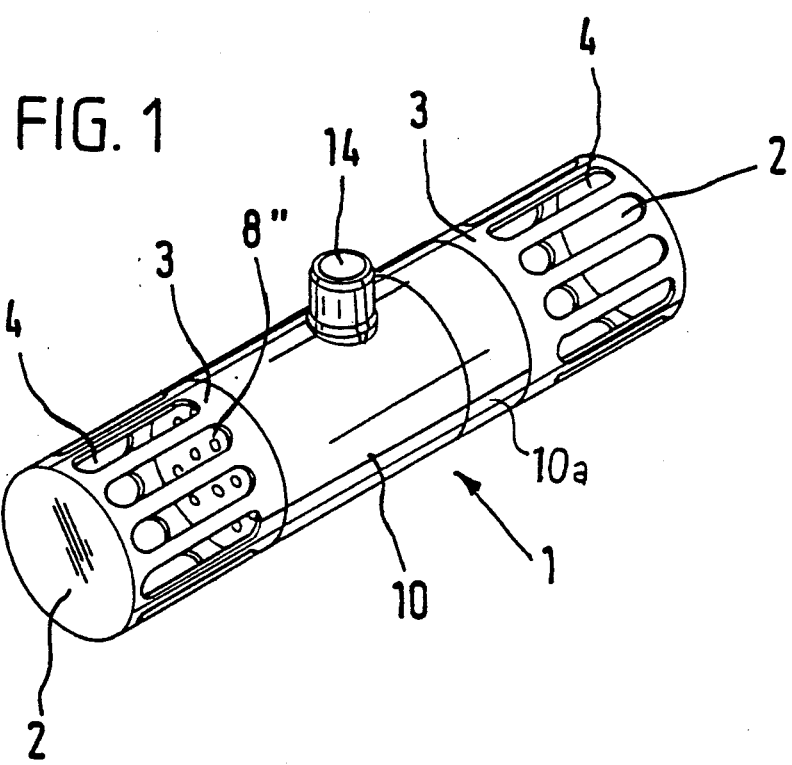
FIG. 1 shows a perspective view of a gas generator according to the invention, for example, made of sheet metal.

FIG. 1 shows a gas generator 1 having a substantially cylindrical configuration including a sheet metal combustion chamber 10 with a closure section 10a and an ignition device 14. These componenents are conventional, and hence not described in further detail. A filter housing 3 with gas outlet slots 4 and an integrated closure cover 15, is secured to each end of the combustion chamber 10, 10a. The invention is not limited to securing the filter housing 3 to the facing ends of the combustion chamber. It is possible to connect the filter housings 3 to the combustion chamber in any conventional way as long as the gas generated in the combustion chamber can enter into the filter housings 3. The filter housings 3 are conventionally connected to a safety bag through a reaction can so that the safety bag can be inflated by the gas generated in the combustion chamber 10 and filtered in the filter housings 3.

Figure 2:
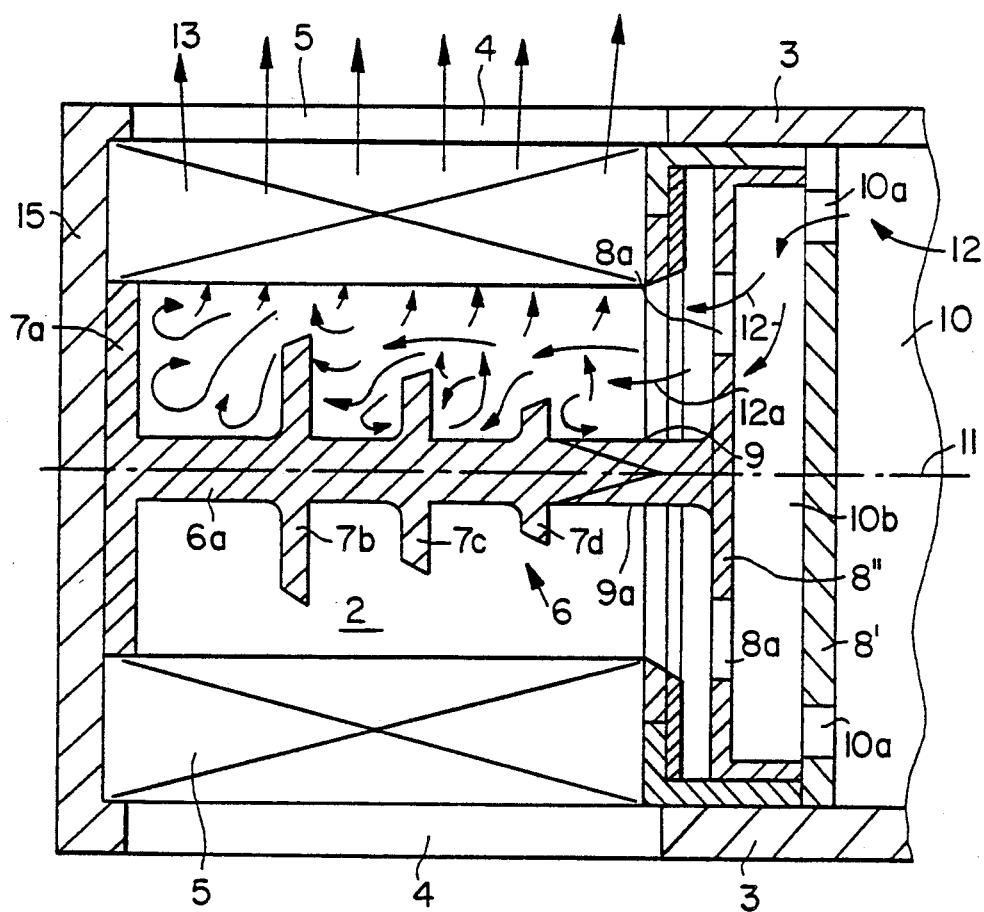
FIG. 2 illustrates a sectional view of one embodiment of a filter housing construction according to the invention, wherein gas flow distribution elements in the form of disks each having an axially facing radially extending surface and a slanted rim surface.

FIG. 2 shows an axial sectional view through the left-hand end of the combustion chamber 10 and the respective filter housings 3. The sheet metal wall of the combustion chamber 10 may simultaneously form the filter housing 3. The end cover 15 may be formed as an integrated or a removable and securable cover 15 for closing and opening the filter cavity 2 for the insertion of a filter cartridge 5 forming a ring filter as shown in the drawings with the gas flow distribution member 6 extending coaxially with the longitudinal axis 11 of the gas generator. The longitudinal slots 4 of the filter housings 3 extend in parallel to the longitudinal axis 11. The slots 4 through which the filtered gas exits into the safety bag as indicated by arrows 13, are cut into the sheet metal housings 3.

Gas generated in the chamber 10 passes through openings or nozzles 10a in an end wall 8' of the combustion chamber 10. The generated gas indicated by the arrows 12 is caused to first flow radially inwardly in a chamber 10b formed between the end wall 8' of the combustion chamber 10 and a separation wall 8" between the filter and the combustion chamber. The separation wall 8" has exit openings or nozzles 8a which are located radially inwardly relative to the entry nozzles or openings 10a to cause the above mentioned initial radially inwardly directed flow of the gas 12. The gas exits through the nozzles 8a substantially in a direction parallel to the longitudinal axis 11 for distribution by the gas flow distribution elements 7a, 7b, 7c, and 7d of the gas flow distribution member 6 in such a way that the substantially axially incoming gas flow becomes turbulent and is caused to exit radially outwardly through the volume of the filter cartridge 5.

The elements 7a, 7b, 7c, and 7d are disks with axially facing radially extending flow influencing surfaces. The disk diameters increase in the axial flow direction, so that the gas direction, so that the gas flow distribution member 6 has preferably a conical shape with its tip 9 facing in the direction opposite to the in-flowing gas indicated by the arrows 12a. The rim surfaces of each disk are slanted as shown to provide a tapered edge described below. The gas flow distribution member 6 could be constructed with the shown tip 9, which is received in a respective recess in a centering member 9a secured, for example, to the partition wall 8". This tip 9 is rather a device for better positioning of the member 6 in the filter unit and is not really necessary for the gas flow distribution control. The flow distribution member 6 has a central shaft 6a to which the above mentioned plurality of disks 7a, 7b, 7c, and 7d are secured for flow distribution. These disks have a diameter which preferably diminishes in the direction opposite to the gas inflow direction. Further, each disk has a tapered edge at its rim surface to provide for an improved turbulence of the gas which is then diverted to flow through the volume of the ring filter cartridge 5 as indicated by the arrows in FIG. 2. Further, the spacing between the individual filter disks 7a, 7b, 7c, and 7d also diminishes in the axial direction. Thus, the spacing between the largest diameter disk 7a and the next smaller diameter disk 7b is the largest spacing. The next spacing between disks 7b and 7c is smaller and so on.

Figure 3:
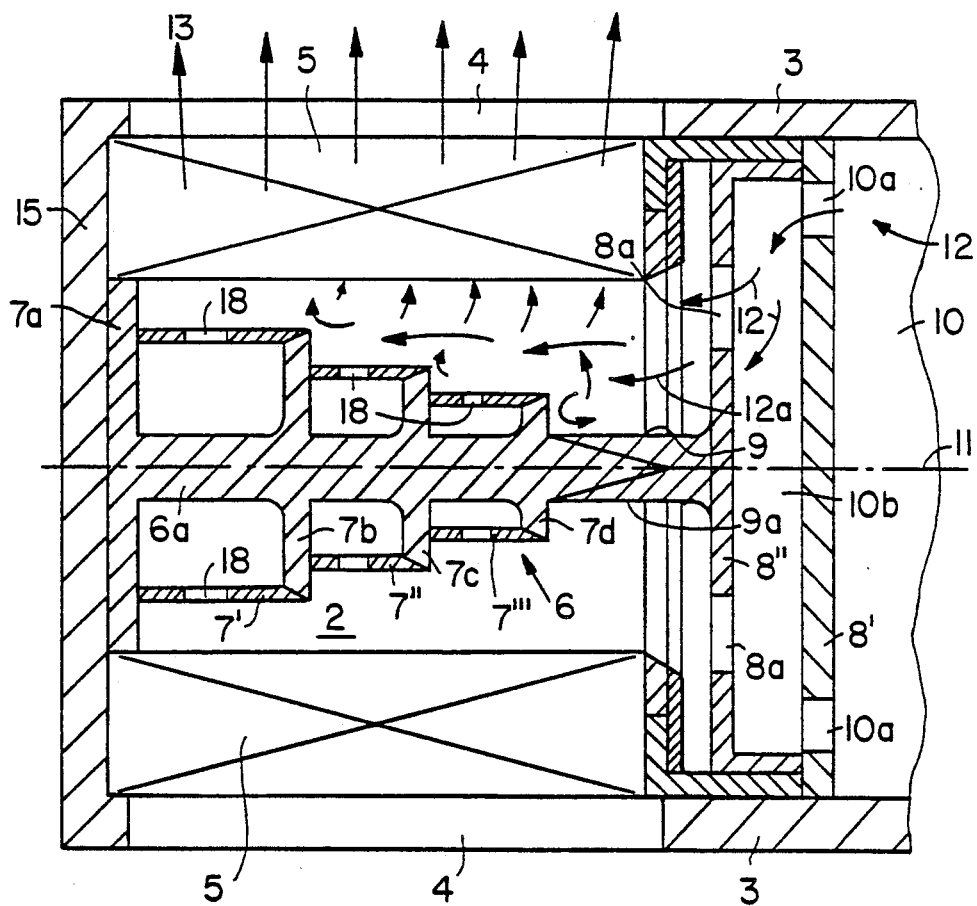
FIG. 3 is a view similar to that of FIG. 2, wherein each disk cooperates with a perforated ring wall to enclose a space behind each disk.
Figure 6:
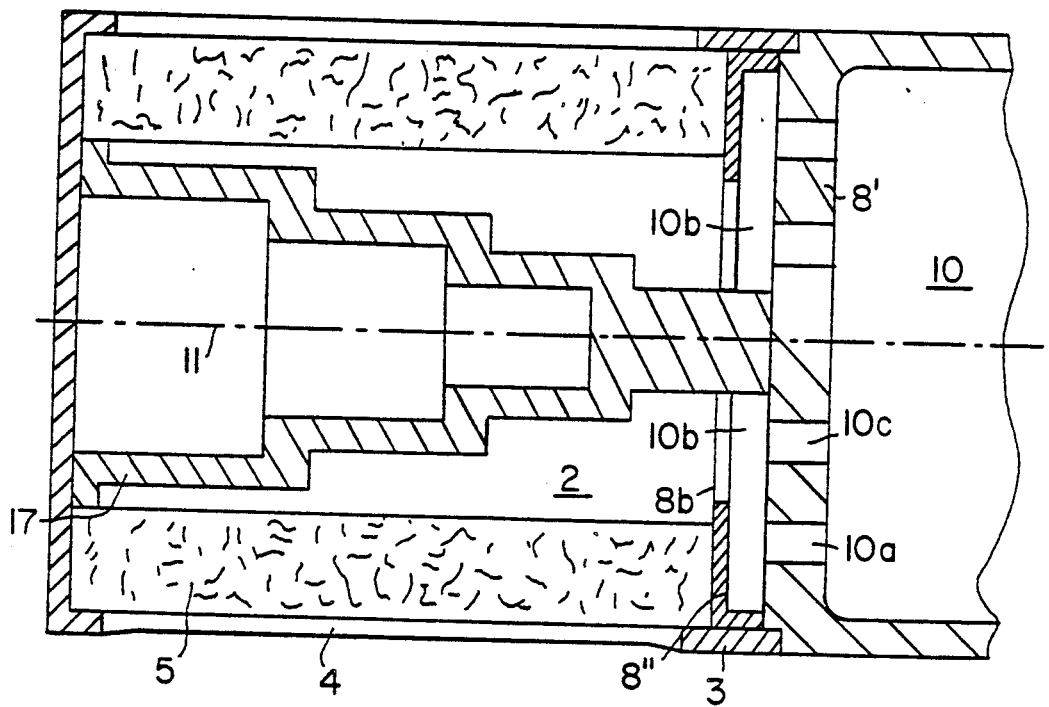
FIG. 6 illustrates a sectional view similar to FIG. 4, but without perforations in the ring walls.

As shown in FIG. 3, an improved turbulence may be achieved by surrounding the space between two neighboring disks with a perforated ring wall as shown at 7', 7", and so forth. However, the ring are optinal. The ring walls 7', 7" and 7''' are cylindrical and surround the space between two neighboring disks which are arranged in the manner of poppet valve disks in steps. Ring walls without perforations are shown in FIG. 6.

The spacing and disk diameters shown, for example, in FIG. 2, and are not critical to the invention. Thus, it is possible to select different spacings which, for example, may be equal to one another and the distribution of the disk diameters may also differ in accordance with the desired gas flow and in accordance with the desired gas throughput. Further, the gas flow distribution member 6 does not necessarily have to have the shown conical configuration. Rather, all disks could have the same diameter to form a substantially cylindrical distribution member. A centering tip as shown at 9 could also be provided on the closure end near the cover 15.

In the embodiment shown, the disks 7a, 7b, 7c, and 7d form steps which contribute to causing a turbulent flow which is then diverted in the radial direction through the entire volume of the ring filter cartridge 5 which is arranged between the outer peripheral edges of the disks and the housing 3 so that the gas to be filtered must pass radially through the filter cartridge 5 and through the slots 4.

The construction of the ring filter body or cartridge 5 may be constructed in different ways. However, the respective filter structures are applicable to all embodiments. For example, filtering material may be formed into a package enclosed by perforated sheet material such as films, membranes, and the like. The filtering material in the ring filter body or cartridge 5 may comprise fiber material or steel wool type material or any other suitable material, such as large pore sponge material including foam-type sponge material having interconnected open pores or labyrinth type channels. The filtering material may also take the form of granular material, whereby the granules may have a spherical configuration or tablet or pellet form. Further, the size and configuration may be uniform or random as long as the individual granules form filtering passages among one another to provide randomly distributed flow passages between the filter material packaged in an envelope or the like which is perforated to permit the gas inlet and exit.

Figure 4:
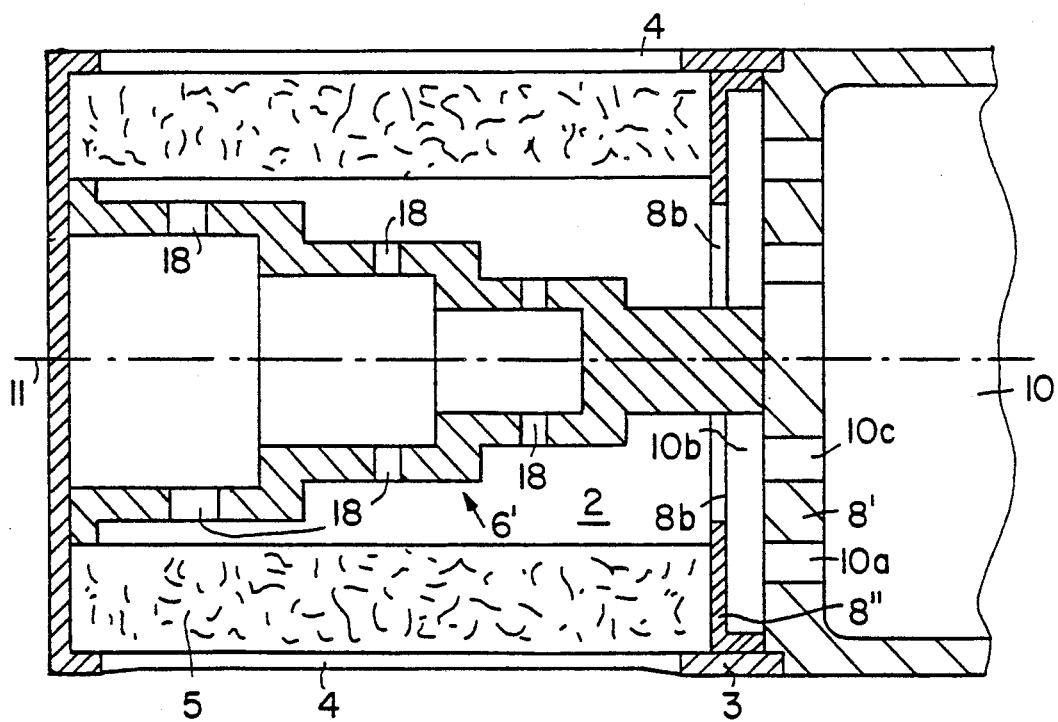
FIG. 4 is a view similar to FIG. 3, wherein disks and ring walls forming the flow distribution elements form a stepped integral conical configuration.

The gas distribution member 6 or 6' shown in FIG. 4 comprises at least one gas flow influencing body in the form of a central shaft 6a carrying a plurality of gas flow distribution elements in the form of the above mentioned disks and ring walls.

These disks 7a, 7b, 7c, and 7d are attached to extend substantially radially as shown in all FIGS. with the flow influencing surfaces facing axially. The perforated gas flow influencing ring wall elements 7', 7" and 7''' may be used in combination with the disks or these elements 7', 7" and 7''' may be used alone. The largest diameter disk 7a is so dimensioned that it fits into the cavity 2 inside the filter body or cartridge 5. At least one, preferably two disks have a diameter fitting into the cavity 2. The length of the gas flow distribution member 6 is also dimensioned to properly fit into the cavity 2.

By providing the chamber 10b an alternative or additive control of the gas flow from the combustion chamber 10 into the cavity 2 and through the filter body or cartridge 5 is accomplished so that the gas flow passes more uniformly through the volume of the filter body 5 to exit through the slots 4 as indicated by the arrows 13.

Figure 5:
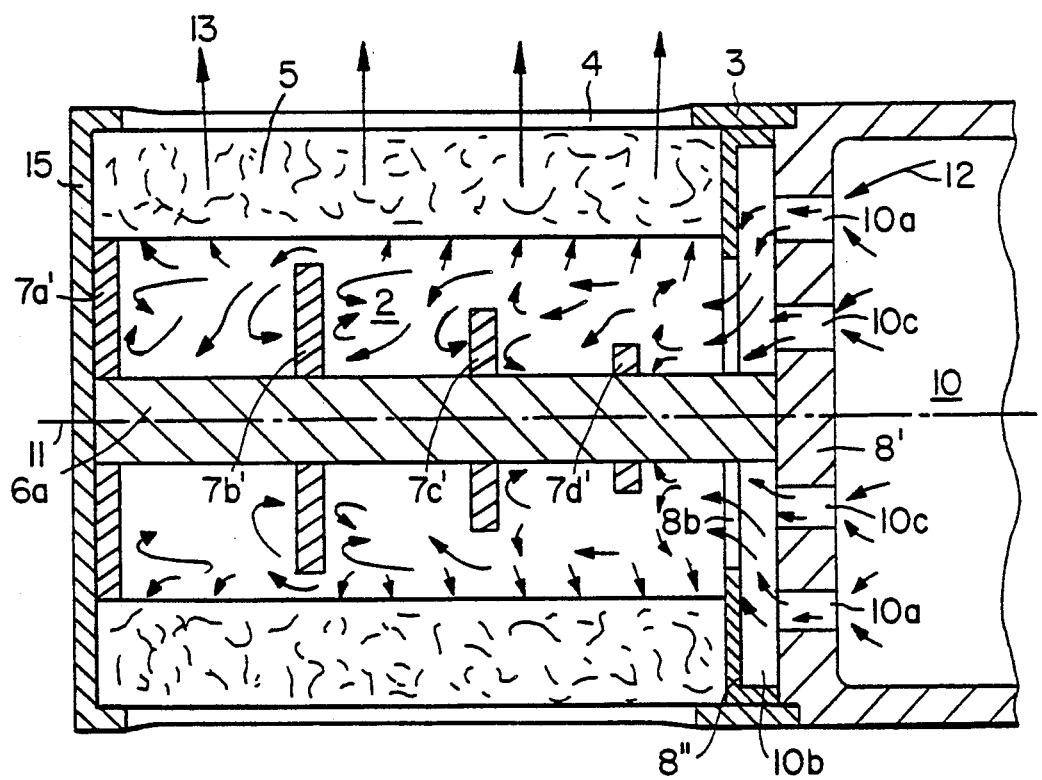
FIG. 5 is a view similar to FIG. 2, wherein the disks have a cylindrical rim wall.

FIGS. 4, 5, and 6 illustrate modifications of the above described embodiments. In FIG. 4 an integral flow distribution body 6' has axially facing ring disks and cylindrical ring walls facing radially and having perforations 18. The disks and ring walls are integrally interconnected to form the unitary, stepped, conical flow distribution body 6'. In FIG. 5 the disks 7a, 7b, 7c, and 7d are substantially the same as in FIG. 2, however, the rim walls in FIG. 5 are cylindrical rather than slanted. FIG. 6 is similar to FIG. 4, but with nonperforated ring walls forming a nonperforated, stepped, conical flow distribution body or element 17. The holes 18 in FIGS. 3 and 4 influence the gas flow by making the gas flow turbulent for uniformly distributing the gas flow onto the entire inner surface of the ring filter 5 for passing the gas through the entire volume of the ring filter or cartridge 5 thereby efficiently using the filter material.

FIG. 5 also shows that the central shaft 6a is made of a material different from that of the disks 7a', 7b', 7c', and 7d'. These disks may be made of sheet metal while the shaft 6a may be made of any other suitable material. Further, the shaft 6a in FIG. 5 rests centered between the end cover 15 and the combustion chamber end wall 8'. In FIG. 5 the combustion chamber end wall 8' is provided with radially outer perforations or nozzles 10a and additionally with radially inner perforations or nozzles 10c. On the other hand, the partition wall 8" and the wall 8' form together the chamber 10b, whereby the wall 8" has only one central hole 8b through which the gas passes axially outwardly toward the gas flow distribution member 6 in the cavity 2.

Although the invention has been described with reference to specific example embodiments, it will be appreciated that it is intended to cover all modifications and equivalents within the scope of the appended claims.

What we claim is:

1. A gas generator, especially for inflating a safety bag, comprising gas generating means including a combustion chamber for producing a gas for said inflating, a filter housing connected to said combustion chamber, means for passing gas produced in said combustion chamber into said filter housing in a first axial direction, ring filter means having a given filter volume and a central cavity located in said filter housing, so that produced gas enters into said central cavity, said filter housing having a housing wall with radially facing gas exit means in said housing wall, so that gas entering said cavity in said first axial direction must pass through said ring filter means and out through said gas exit means in a second radial direction, and axially effective gas flow distribution means in said cavity for substantially uniformly distributing axially in-flowing gas over a ring filter surface facing said cavity, said gas flow distribution means comprising a plurality of gas flow influencing elements for converting an axial gas inflow into a radial turbulent gas outflow which is substantially uniformly distributed onto said ring filter surface for efficiently using substantially all of said given filter volume of said ring filter means.

2. The gas generator of claim 1, wherein said gas flow influencing element comprises a plurality of disks for influencing said gas flow, and a central shaft, said disks being secured to said central shaft at axially spaced intervals, said shaft having a longitudinal axis coinciding with a longitudinal axis of said gas generator.

3. The gas generator of claim 2, wherein said spaced intervals have axial lengths that increase in the axial direction from a gas inlet side of said filter housing toward an opposite end of said filter housing.

4. The gas generator of claim 2, wherein said disks have diameters that increase in the axial direction from a gas inlet side of said filter housing toward an opposite end of said filter housing so that all disks together form an approximately conical configuration facing with its tip in an axial direction opposite to a gas in-flow direction.

5. The gas generator of claim 4, wherein said gas flow influencing element further comprises perforated or nonperforated rings surrounding said intervals.

6. The gas generator of claim 1, wherein said gas flow influencing element comprises a perforated sheet material member.

7. The gas generator of claim 1, wherein said first direction extends substantially in parallel to a longitudinal central axis of said gas generator and of said filter housing, said second direction extending substantially radially to said first direction.

8. The gas generator of claim 1, wherein said gas flow distribution means have an approximately conical or stepped configuration.

9. The gas generator of claim 2, wherein said gas flow influencing disks are made of one material and said central shaft is made of another material, said disks extending radially in the manner of a poppet valve disk, said disks being axially spaced from one another.

10. The gas generator of claim 9, wherein said flow influencing disks are spaced from one another at nonuniform spacings in an axial direction, and wherein said disks have diameters or cross-sections which also differ from disk to disk.

11. The gas generator of claim 10, wherein said flow influencing disks form steps in the axial direction, said gas flow distributions means further comprising gas throttling or flow delay means surrounding said gas flow distribution means around said spacings in accordance with said steps.

12. The gas generator of claim 11, wherein said throttling or flow delay means comprise sheet metal rings having perforations therein for causing a turbulent gas flow.

13. The gas generator of claim 1, wherein said gas flow distribution means have an approximately conical shape with a conical tip directed axially toward an axial gas in-flow.

14. The gas generator of claim 1, wherein said gas flow distribution means is received centrally in a filter cavity into which it fits with regard to its length and its diameter.

15. The gas generator of claim 14, wherein said filter cavity has a gas in-flow wall comprising gas in-flow nozzles positioned for directing in-flowing gas toward said gas flow distribution means.

16. The gas generator of claim 15, further comprising a gas exit wall as part of said combustion chamber, said gas exit wall being spaced from said gas in-flow wall to form a gas flow directing chamber between said combustion chamber and said filter cavity.

17. The gas generator of claim 1, wherein said ring filter means have a ring filter volume of filter material surrounding said gas flow distribution means, said volume surrounding a filter cavity with a bore sufficient to receive the largest diameter portion of said gas flow distribution means.

18. A gas generator, especially for inflating a safety bag, comprising gas generating means including a combustion chamber for producing a gas for said inflating, a filter housing connected to said combustion chamber, means for passing gas produced in said combustion chamber into said filter housing in a first axial direction, ring filter means having a given filter volume and a central cavity located in said filter housing, so that produced gas enters into said central cavity, said filter housing having a housing wall with radially facing gas exit means in said housing wall, so that gas entering said cavity in said first axial direction must pass through said ring filter means and out through said gas exit means in a second radial direction, and axially effective gas flow distribution means in said cavity for substantially uniformly distributing axially in-flowing gas over a ring filter surface facing said cavity, said gas flow distribution means comprising gas flow influencing elements for converting an axial gas inflow into a radial turbulent gas outflow which is substantially uniformly distributed onto said ring filter surface for efficiently using substantially all of said given filter volume of said ring filter means, and wherein said gas flow influencing elements are axially facing substantially radially extending flow guide surfaces having diameters that increase in the axial direction from a gas inlet side of said filter housing toward an opposite end of said filter housing, so that all gas flow influencing surfaces form together an approximately conical configuration facing with its tip in an axial direction opposite to a gas inflow direction.

19. The gas generator of claim 18, wherein said gas flow influencing elements further comprise perforated or nonperforated ring walls surounding said intervals.

20. The gas generator of claim 19, wherein said gas flow influencing surfaces comprise ring surfaces facing axially and extending substantially radially.

21. The gas generator of claim 18, wherein said gas flow influencing elements comprise disks having said axially facing substantially radially extending flow guide surfaces.

* * * * *